United States Patent
Hession et al.

(10) Patent No.: US 7,769,161 B1
(45) Date of Patent: Aug. 3, 2010

(54) CONTACT CENTER

(75) Inventors: Patrick Hession, Galway (IE); Tony McCormack, Galway (IE); Arik Elberse, Galway (IE)

(73) Assignee: Avaya, Inc., Basking Ridge, NJ (US)

( * ) Notice: Subject to any disclaimer, the term of this patent is extended or adjusted under 35 U.S.C. 154(b) by 921 days.

(21) Appl. No.: 10/738,489

(22) Filed: Dec. 17, 2003

(51) Int. Cl.
*H04M 3/00* (2006.01)
*G06F 15/16* (2006.01)
*G06Q 10/00* (2006.01)

(52) U.S. Cl. .......................... 379/266.01; 379/265.02; 709/227; 705/1.1

(58) Field of Classification Search ............. 379/266.01
See application file for complete search history.

(56) References Cited

U.S. PATENT DOCUMENTS

| | | | |
|---|---|---|---|
| 6,650,747 B1 * | 11/2003 | Bala et al. | 379/265.06 |
| 6,744,858 B1 * | 6/2004 | Ryan et al. | 379/45 |
| 6,822,945 B2 * | 11/2004 | Petrovykh | 370/270 |
| 6,937,715 B2 * | 8/2005 | Delaney | 379/265.09 |
| 6,985,576 B1 * | 1/2006 | Huck | 379/265.09 |
| 7,106,850 B2 * | 9/2006 | Campbell et al. | 379/265.09 |
| 7,523,045 B1 * | 4/2009 | Walker et al. | 705/8 |
| 2002/0029272 A1 * | 3/2002 | Weller | 709/226 |
| 2003/0103621 A1 * | 6/2003 | Brown et al. | 379/266.01 |
| 2005/0163304 A1 * | 7/2005 | Judkins et al. | 379/265.02 |
| 2005/0238163 A1 * | 10/2005 | Brown et al. | 379/266.01 |
| 2007/0230684 A1 * | 10/2007 | Walker et al. | 379/266.01 |

FOREIGN PATENT DOCUMENTS

EP  1122937 A2 *  8/2001

OTHER PUBLICATIONS

Business Wire, "Siemen's ResumeRouting CRM Suite Goes Multi-Site", Aug. 31, 1999, Business Wire, p. 1.*
M2 Presswire, "Nortel Networks: Nortel Networks Introduces Converged Solutions for Small Enterprises. Branch Offices; BCM Release 3.0 includes IVR, IPSEC Client Support, Increases TDM Station Capacity", Dec. 9, 2002, M2 Presswire, p. 1.*

* cited by examiner

*Primary Examiner*—John W Hayes
*Assistant Examiner*—Fadey S Jabr
(74) *Attorney, Agent, or Firm*—Barnes & Thornburg LLP

(57) ABSTRACT

One problem faced by contact center providers is how to most effectively balance limited contact center resources against the need to provide good customer service. The present invention addresses this problem by enabling a contact center to use external resources such as freelance contact center agents and media servers. This is achieved in such a way that those external resources are controlled by the contact center and their use is effectively transparent to end users of the contact center.

10 Claims, 2 Drawing Sheets

CONTACT CENTER

FIELD OF THE INVENTION

The present invention relates to contact centers and web services.

BACKGROUND TO THE INVENTION

Call centers are known in which incoming calls are routed to one of a plurality of agents. For example, the call center might provide help desk facilities for a particular group of products. Customers are able to call in and be allocated to an agent who has the necessary skills to deal with the customer's query. Each agent has one or more skills, for example, a particular agent has knowledge about sales for product X and about technical support for product Y. An incoming call is received and information from that call used by the call center, together with information about the agents, in order to route the incoming call to an agent with the appropriate skill. For example, an interactive voice response system (IVR system) may be used to find out what type of agent skill is required. Associated with each skill is a queue into which incoming calls are placed until an agent with that skill becomes available.

The terms "call center" and "contact center" as used herein are not intended to be restricted to situations in which telephone calls are made to the center. Other types of call or contact are also envisaged, such as email, fax, SMS, chat, web access, video access and any other suitable method of contact including conventional telephone calls and voice over internet protocol telephone calls. Similarly, the terms "call" and "contact" as used herein are not intended to be restricted to conventional telephone calls but include contacts made by email, fax, voice over IP and any other suitable medium.

As mentioned above, a contact center typically uses a "treatment system" such as an IVR system or other system for providing a service to incoming calls. For example, this might be a system for playing recorded announcements, streaming video, or sending automatic email replies to customers. Other options include music on hold systems and systems for sending automatic replies in other media.

One problem faced by contact center providers is how to most effectively balance limited contact center resources against the need to provide good customer service. For example, the number of agents available at the contact center and their particular skills affects the number of contacts that the center can deal with at any one time. The particular skills of the agents affects how well the agents are able to deal with individual customer contacts. The more agents that are provided the higher the costs for the contact center provider and so there is a need to find a balance between the resources provided and the customer service quality required. This applies to other contact center resources besides agents. For example, the bandwidth required between contact center entities to enable those entities to communicate and the resources of the treatment system.

Consider the situation in which the treatment system plays streaming video to the end user or customer. Streaming video is relatively bandwidth intensive and thus costly. This also applies for other media as well as video.

Contact Center providers often find it difficult to procure and maintain agents that can fulfil the skillsets required to deliver required services. This is a particular problem the more remote the end user is from the contact center and its agents.

For example, the native language of personnel at the contact center is likely to be different from that of the end user or customer the more remote the contact center is. Cultural differences between the customers and the contact center agents are also likely to be greater and the contact center agents are unlikely to have local knowledge about the geographical region in which the customer is located. Previously it has been suggested to use a plurality of contact centers networked together. For example, U.S. patent application Ser. No. 09/471,143 filed on Dec. 23, 1999 and also assigned to Nortel Networks Limited describes a plurality of call centers in a communications network. There is a need to route calls between the call centers, for example, for load balancing, if a suitable agent is not available at a particular call center, or if the queue time at some call centers is unacceptable. In that system, each call center in the network sends call center management information to a network call center controller at a regular interval. The network call center controller evaluates this information and forms updated routing tables for each network skillset. The updated routing tables are then sent, by the network call center controller, to each call center. Each call center then uses the updated routing tables to queue inbound calls to multiple remote call center servers as well as locally. The present invention is also concerned with the problem of limited contact center resources, as well as other problems, but is not limited to the situation in which there are a plurality of networked contact centers.

OBJECT TO THE INVENTION

The invention seeks to provide an improved contact center which overcomes or at least mitigates one or more of the problems mentioned above.

Further benefits and advantages of the invention will become apparent from a consideration of the following detailed description given with reference to the accompanying drawings, which specify and show preferred embodiments of the invention.

SUMMARY OF THE INVENTION

One problem faced by contact center providers is how to most effectively balance limited contact center resources against the need to provide good customer service. The present invention addresses this problem by enabling a contact center to use external resources such as freelance contact center agents and media servers. This is achieved in such a way that those external resources are controlled by the contact center and their use is effectively transparent to end users of the contact center.

According to an aspect of the present invention there is provided a method of enabling a contact center to use external resources said method comprising the steps of:
  accessing, from an advertisement node in a communications network, the contact center having access to the communications network, details of services published by entities for use by contact centers, those entities being in the communications network;
  selecting one of the entities on the basis of the accessed details;
  accessing control information associated with the selected entity;
  using said control information to configure the entity for use by the contact center such that the entity meets pre-specified requirements.

For example, the entities may be terminals of freelance contact center agents or freelance media servers offering their services for use by contact centers. The contact center finds details of the entities at the advertisement node and uses this to select a particular entity whose services the contact center wishes to use. For example, the details are about skills of freelance contact center agents and the contact center selects a freelance agent with skills that the contact center needs at the particular time. The contact center then accesses control information and uses this to configure the entity for use by the contact center. For example, in the case of a freelance contact center agent, that agent's terminal is configured such that the contact center is able to monitor and control the freelance agent.

Preferably the pre-specified requirements are such that the contact center is then able to use the entity in a manner transparent to end users of the contact center. This is particularly advantageous because the contact center is able to use external resources, for example, freelance agents or freelance media servers, in such a way that customers of the contact center are unaware that the external resources are being used. In many situations this enables even better customer service to be provided than if the call had been terminated on a local agent.

Preferably the pre-specified requirements are such that the contact center is able to control at least part of the entity's operation as part of the contact center. This ability enables the contact center to ensure that the entity operates in a manner that meets the contact center requirements.

Furthermore said control information is preferably also used to configure the entity such that it provides information about its status to the contact center. This enables the contact center to monitor behaviour of the entity.

Preferably said entities comprise any of contact center agent stations and contact center treatment systems. Contact center treatment systems are any type of system suitable for sending a communication to an end user or customer of a contact center. For example, the treatment system can be an interactive voice response (IVR) system, a music on hold system, a system for playing recorded announcements, a system for issuing streaming video, a system for sending automatic response emails, text messages, faxes, or messages of any other suitable media type.

Preferably said step (ii) of selecting one of the entities further comprises establishing an agreement between the contact center and the selected entity concerning provision of the external resources. For example, this agreement is a contract which may be electronic and which sets out what services the entity is to provide in return for what payment from the contact center.

Preferably the advertisement node comprises a directory of web services. This provides a simple and effective means for the entities to publish details of their offered services and for contact centers to access those details.

Advantageously, the entities provide web services. For example, the freelance contact center agents effectively provide a web service which comprises their ability to operate as a contact center agent. This provides the advantage that a directory of web services can easily be used at the advertisement node. Also, the control information can be provided using known protocols for web services such as web service description language (WSDL) and web service endpoint language (WSEL) or any other suitable protocol.

According to another aspect of the invention there is provided a contact center arranged to use external resources said contact center comprising:

an input arranged to access, from an advertisement node in a communications network to which the contact center has access, details of services published by entities for use by contact centers, those entities being in the communications network;

a processor arranged to select one of the entities on the basis of the accessed details;

an input arranged to access control information associated with the selected entity; and wherein said processor is also arranged to use said control information to configure the entity for use by the contact center such that the entity meets pre-specified requirements.

This procedure can be completely automatic, or can be a mixture of automatic and manual operation. For example, a contact center supervisor browses the advertising node manually, selects an agent manually and then invokes a configuring Web Service which proceeds automatically.

The contact center is able to use external resources as and when it needs to. For example, at busy times or when undergoing a large inbound or outbound campaign, the contact center may not have sufficient agents to deal with the workload. However, the contact center is able to select freelance agents or other resources from the advertisement node and use the control information to integrate those resources into the contact center. This process occurs on-the-fly so that the contact center is able to use extra external resources as and when needed. Thus the contact center itself need not have any agents physically located near the contact center server. That is, all the agents used may be freelance ones.

Some examples of situations in which the method can be used are now given although these examples are in no way exhaustive. A first example involves the situation in which the contact center needs large numbers of agents but the skills of those agents do not need to be specialised. For example, this situation arises for outbound marketing campaigns in which agents are simply required to read from a script. In this case freelance agents can be contracted-in.

A second example involves situations in which agents with very specific or rare skillsets are required. In this case it often does not make economic sense for a contact center to permanently retain such an agent. Rather the agent can be contracted-in.

Another advantage of using freelance agents is that it is possible for the contact center to pick agents who are physically located close to a customer of the contact center. For example, if the contact center receives a contact from a different geographical region it is able to contract in a freelance agent from that geographical region. The customer can then be provided with an enhanced service because the freelance agent is likely to have the same cultural knowledge, local knowledge, and native language as the customer. The contact center is also able to save costs and the bandwidth used on the communications network is reduced by enabling the contact center to use agents or other resources that are physically located in the same region as the customer. This advantage is particularly effective in the case that freelance contact center treatment systems are used. For example, the treatment system issues streaming video to the customer which is a bandwidth intensive operation. By contracting in a freelance treatment system located near to the customer, costs are reduced because the transmission distance for the streaming video is reduced. In this case the Contact Center is contracting out delivery of the streaming video to be directly between the Media Server and the customer, but under control of the Contact Center. When the Media Server is closer to the customer in this way or is closer to the customer vis a vis data network hops, then the customer is likely to experience improved quality of service.

According to another aspect of the present invention there is provided an advertisement node for use in a public communications network to advertise services of a plurality of freelance contact center entities in the communications network, said node comprising:

a database comprising details of capabilities and requirements of each advertised freelance entities;

for each advertised freelance entity, information about how to access control information for controlling said freelance entity.

This provides a simple and effective means by which the freelance entities can advertise their services and enable contact centers to access control information to control those freelance entities.

The invention also encompasses a communications network comprising an advertisement node as described above and one or more contact centers as described above.

The invention also encompasses computer software stored on a computer readable medium and arranged to control a contact center to carry out the method described above.

The invention also provides for a system for the purposes of digital signal processing which comprises one or more instances of apparatus embodying the present invention, together with other additional apparatus.

The preferred features may be combined as appropriate, as would be apparent to a skilled person, and may be combined with any of the aspects of the invention.

BRIEF DESCRIPTION OF THE DRAWINGS

In order to show how the invention may be carried into effect, embodiments of the invention are now described below by way of example only and with reference to the accompanying figures in which.

DETAILED DESCRIPTION OF INVENTION

Embodiments of the present invention are described below by way of example only. These examples represent the best ways of putting the invention into practice that are currently known to the Applicant although they are not the only ways in which this could be achieved.

As mentioned above contact center providers seek to balance their limited contact center resources against the need to provide good customer service. The present invention addresses this problem by enabling a contact center to use external resources such as freelance contact center agents and media servers. This is achieved in such a way that those external resources are controlled by the contact center and their use is effectively transparent to end users of the contact center.

Figure 1:
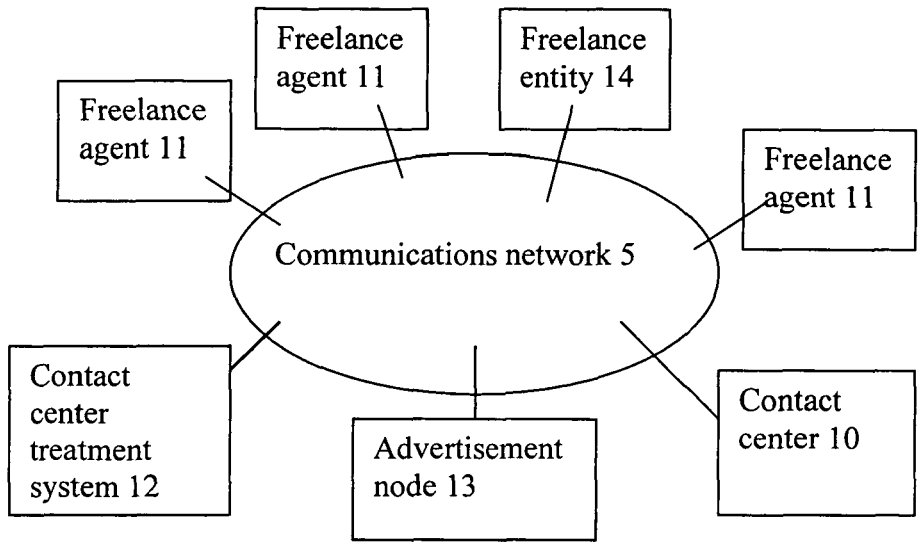
FIG. 1 is a schematic diagram of a communications network with a contact center and freelance contact center entities.

FIG. 1 is a schematic diagram of a communications network 5 comprising a contact center 10, a plurality of freelance contact center agent stations 11, a freelance contact center treatment system 12 and a freelance entity 14. Also shown is an advertisement node 13 at which the freelance agents 11 and freelance treatment system 12 advertise their services. The communications network 5 itself is of any suitable type such as a data network being the Internet, an Intranet or other data network. The freelance entity 14 is shown to make it clear that the invention is applicable to other types of freelance service for contact centers besides contact center agents and treatment systems. The term "freelance entity" is used to refer to freelance agents, freelance treatment systems, freelance contact center supervisors, and any other suitable type of entity suitable for offering services for use by contact centers.

The contact center 10 is arranged to be able to use external resources as and when required. This is achieved using a method as now described with reference to FIG. 2.

Figure 2:
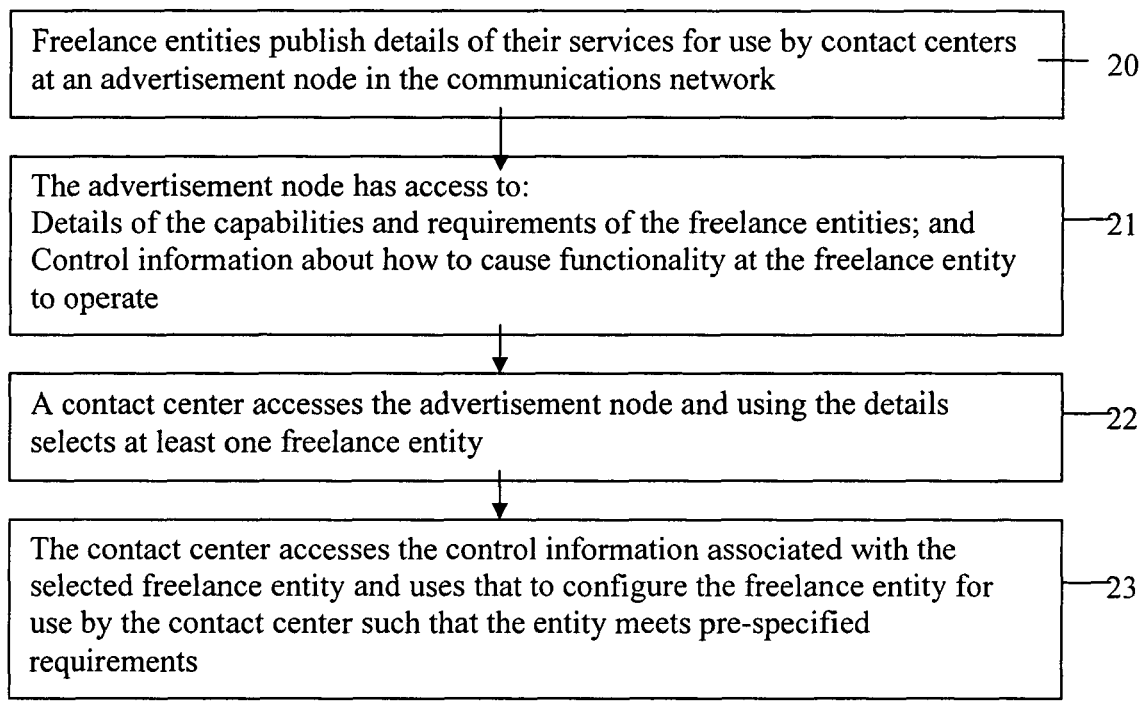
FIG. 2 is a flow diagram of a method of enabling a contact center to use external resources.

FIG. 2 is a flow diagram illustrating a method of enabling a contact center to use external resources. Those external resources such as freelance agents, treatment systems or other freelance entities publish their services for use by a contact center at the advertisement node 13 (see box 20 of FIG. 2).

In one embodiment the advertisement node 13 is a web server and it uses a web service registry such as a universal description, discovery and integration (UDDI) protocol registry to publish the information about the freelance entities. This is sometimes known as an e-Marketplace. However, it is not essential to use a UDDI registry. For example, a database accessible via a web-interface can also be used or a blackboard type system. Other examples include a simple Web Page with redirection to the Contact Center resources of interest, an automated directory enquiries of services, or a manual directory.

The advertisement node has access to information about the freelance to entities (see box 21 of FIG. 2). For example, this comprises details about the capabilities of the freelance entity. This can be details about qualifications that a freelance agent has such as Help Desk 2000 (trade mark) certification, skill sets and language abilities. Details about the physical location of the freelance agent are also available. Other details about the physical capabilities of the freelance agent's equipment are accessible such as what media types (email, fax, video, voice etc.) the freelance agent is able to work with, what hardware is available and whether the freelance agent has a public internet address. In the case that the freelance agent is using a session initiation protocol (SIP) endpoint details of any applicable public SIP universal resource indicator (URI) can be given.

The advertisement node 13 also has access to information about the requirements of the freelance entities 14. For example, charging rates, working hours and availability for work.

In addition the advertisement node 13 has information about how to obtain control information. This control information is about how to cause functionality at the freelance entity to operate.

For example, in one embodiment the freelance entities 14 each comprise a web service.

A "web service" comprises a software application or other functionality provided at a web server and accessible over a data network such as the Internet. For example a Web service is provided as an interface that describes a collection of operations that are network accessible through standardised extendible mark-up language (XML) messaging. Web services fulfil a specific task or set of tasks and can be combined with other Web Services to achieve a desired function. For example, the web service can be a machine translation service to translate text from French to English. Software to provide this translating ability is provided at a web server and end users are able to remotely use this software for example, via a web-based interface comprising web pages or by obtaining pre-specified information about how to use the software. This pre-specified information is typically provided using a protocol such as web service endpoint language (WSEL) or web service description language (WSDL) but any suitable protocol or other format can be used. Another example of a suitable protocol is the ebXML collaboration-Protocol Profile and Agreement specification (CPP). The pre-specified information is about how to use the software and for example comprises names of all the functions or routines that can be called, the parameters for those functions and what type of value is returned by the functions. Using this information an end user or other entity is able to send instructions to the web service that cause the software to operate and return results back to the entity.

Typically the pre-specified information about how to use the software application is stored at the web server where the software application is stored, but it can also be stored at another location. The user of the web service is able to download the pre-specified information using any suitable known method.

As mentioned above in one embodiment the freelance entities 14 each comprise a web service. In that case, the software applications required to provide the contact center agent service or other service are stored at a web server. This web server for example, can be at the freelance agent's premises or can itself be remote from the actual agent provided that the services, when invoked are targeted at the agent.

The control information required to use the web service is provided for example as a WSDL file and the advertisement node 13 has a pointer or other address of the location of that file or has that information available itself.

The contact center accesses the information at the advertisement node 13 and uses that information to select an appropriate freelance entity 14 (see box 22 of FIG. 2). The contact center itself has specified criteria that the freelance entities need to meet. For example, these specified criteria are defined by a supervisor or are determined dynamically using information about the current state of agents and agent queues at the contact center as well as information about expected volumes of incoming or outgoing contacts.

The contact center has now selected one or more freelance entities and it accesses control information associated with those freelance entities (see box 23 of FIG. 2). The control information is used by the contact center to configure the freelance entity for use by the contact center such that the entity meets pre-specified requirements. For example, these requirements are such that use of the freelance entity by the contact center will be transparent or unapparent to a customer of the contact center. The requirements can also be such that the contact center is able to control and/or monitor the freelance entity. For example, the freelance entity can be configured to send status reports to the contact center.

In the example mentioned above where the freelance entities provide their own web services, the contact center is able to use the control information to configure the freelance entity to the needs of the contact center. A particular example of this is discussed in more detail below with reference to FIG. 3 in which the contact center and freelance entities are SIP enabled.

Returning to the flow diagram of FIG. 2 it is also possible for the steps of box 22 to further comprise the establishment of an agreement or contract between the selected freelance entities and the contact center. This is achieved either by use of a standard agreement or by negotiating specific terms between the two parties using automated methods as known in the art. The resulting agreement is then stored at the advertisement node, or by the parties.

In this way the method of FIG. 2 can be used repeatedly or at various times on-the-fly by the contact center to provide additional resources as and when required. It is also possible for the contact center itself to have no dedicated agents; for example, all the contact center agents can be freelance.

Figure 3:
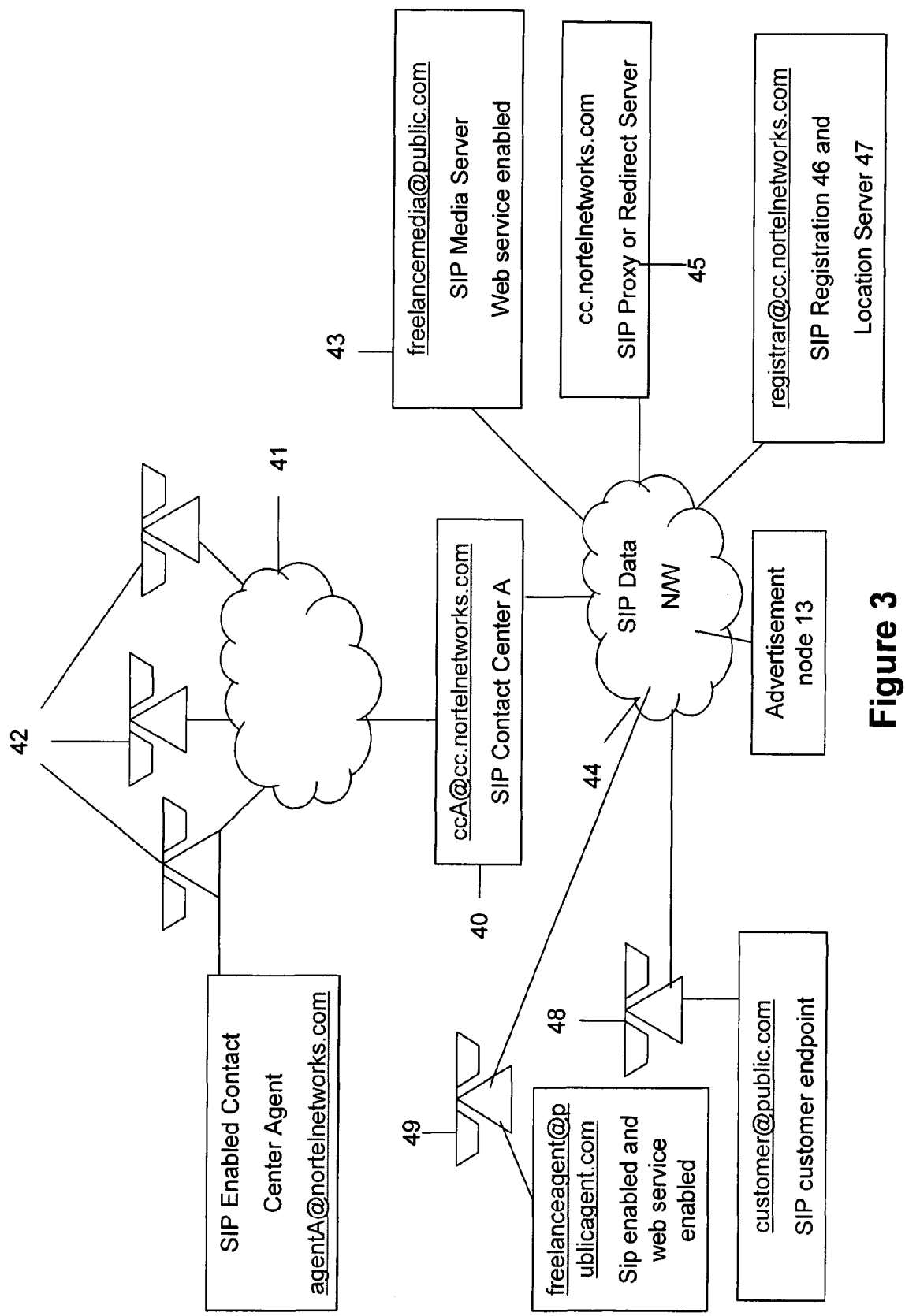
FIG. 3 is a schematic diagram of a session initiation protocol communications network with a contact center and freelance contact center entities.

With reference to FIG. 3 a contact center server 40 and freelance entities 49 which are SIP enabled are shown.

As known in the art, SIP is a protocol that can be used to set up communication sessions over a packet data network where those communication sessions are for voice, video, instant messaging (IM) or other suitable media. This is often referred to as "voice over internet protocol" (VoIP) although the communication sessions are not limited to voice. A SIP enabled contact center is thus able to handle contacts received over a SIP data network and these may be of many different media types. SIP is defined in IETF RFC 3261, and other relevant SIP related IETF RFCs.

FIG. 3 is a schematic diagram of a SIP enabled contact center in a communications network. The contact center comprises a server 40 connected via a SIP data communications network 41 to a plurality of SIP enabled agent terminals 42. The communications network 41 can be an enterprise network that is connected to another data network 44 such as the Internet or a company-wide Intranet. The enterprise network 41 may be private with respect to the other data network 44 and in that case network address translators are used as known in the art. That is, for reasons of clarity, only those components of the SIP contact center and networks needed for explaining the invention are shown in FIG. 4. Other components are used as known to the skilled person in the art.

The contact center server 40 acts to receive contacts from end users 48 connected to it via the SIP data network 44. These end users could also be non-SIP enabled users connected to the SIP network via a protocol converter such as an ISDN to SIP Gateway converter for standard telephony users (or other suitable converter). These contacts are distributed to appropriate agents 42 by the entry system of the contact center server 40.

The contact center optionally makes use of a freelance SIP media server 43 which is used to provide additional functionality for the contact center entry system. For example, this can be music-on-hold, recorded announcements or interactive voice response as known in the art. This media server 43 is an example of a contact center treatment system as mentioned above. The contact center uses SIP (or another suitable protocol) to deliver the end-user session to the freelance Media Server and then uses a combination of standard control messaging such as voiceXML and Call Control XML to deliver the desired treatment to the end-user.

An advertisement node 13 is provided as described above with reference to FIG. 1. This node is part of the SIP data network 44 in this example.

Freelance contact center agents 49 are SIP enabled and have access to the SIP data network 44 as illustrated.

The SIP data network also comprises a SIP proxy or redirect server 45 and a SIP registration 46 and location server 47 as known in the art. Although only one of each of these items is illustrated others may be present in the data network 44. It is not essential for the SIP registration and location server to be provided at the same entity, these items may be separate as known in the art.

As mentioned above SIP is defined in IETF RFC 3261 and other RFCs and comprises various different types of entity including SIP endpoints, SIP registrars, SIP location servers and SIP proxy or redirect servers. The way in which these entities are applied in the present embodiment is now described.

SIP Endpoints

SIP endpoints for the purposes of this embodiment are considered as intelligent stateful entities consisting of a SIP UAC (Client) and SIP UAS (Server). SIP endpoints can terminate or originate SIP sessions which can contain user to user information (e.g. Instant Messaging) or negotiation messaging to set up other parallel information streams (e.g. SDP). They can also terminate or originate Voice, Video or other multimedia messaging streams or redirect these streams to other entities as negotiated potentially via the Session Description Protocol (SDP) information transported over SIP. SDP is variously covered by RFC3264 and RFC2327.

In this embodiment SIP endpoints REGISTER their location as per RFC3261 with a SIP Registrar 46 and have an identified Proxy 45 or redirect server through which SIP sessions are passed for Address Resolution and other such functions.

SIP endpoint types for this architecture include: SIP Clients (the Contact Center Agent User Interface 42); SIP Media Server 43 (the media and treatment response entity) the SIP contact center server 40, the customer's endpoint or terminal 47, and the freelance entities' endpoint or terminal 49. However, as mentioned above it is not essential for the invention to be implemented using SIP. Other protocols such as H.323 can be used or standard telephony with a Computer Telephony Control Interface (which the freelance agent supports on his equipment and exposes for control by the Contact Center via web services).

SIP Registrar 46

The SIP Registrar 46 is an entity to which the SIP endpoints send REGISTER messages to identify their current location in the data network 44. Generally the SIP Registrar 46 stores data in the location server (or is one and the same as the location server 46 as illustrated in FIG. 4). A further requirement of the SIP Registrar is generally to provide authentication services for the SIP user 47 (confirm user is configured and validates user password). Various authentication services are common including HTTP Digest (RFC2069 and RFC2617).

As explained in RFC3261 a register request can be used to add, remove and query bindings. In the present embodiment, these bindings are used to form an association between the selected agent and the unique identifier given to the end user. A register request can be used to add a binding between one or more contact addresses and an address of record. A "SIP address of record" (AOR), as defined in RFC3261, is a SIP or SIP URI that points to a domain with a location service that can map the URI to another URI where the user might be available. Typically, the location service is populated through registrations. An AOR is frequently thought of as the "public address" of the user.

This registration process can be performed by a suitably authorised third party on behalf of a particular address of record. In the embodiment being described, the suitably authorised third party is the contact center server 40.

It is also possible for a SIP client to remove existing bindings or query to find out which bindings currently exist for an address of record.

SIP Location Server 47

The location server 47 stores information that assists in resolving a User's Address of Record URI to an actual location that a User is currently Registered at. A SIP proxy or redirect server is able to input a URI to the location server and obtain details of any associated URIs to which to send a request. The information accessible to the location server is either obtained as a result of registrations made at the Registration Server or may be to mapping functions configured at the direction of an administrator.

SIP Proxy or Redirect Server 45

This provides redirect or forwarding services for SIP sessions. If entity A wishes to initiate a session with entity B it can use SIP Proxies to resolve the location of the endpoint and move the request "closer" to entity B until such time as the Proxy nearest entity B presents the session directly to it.

As mentioned above, the freelance entities 49, 43 advertise their services at the advertisement node 13. The contact center server 40 accesses information at the advertisement node 13 and selects one or more freelance entities 49, 43 for use. An agreement is then optionally established between the selected freelance entity and the contact center. The contact center then obtains control information associated with the selected freelance entity. For example, this is provided as a WSDL file as mentioned above. Using the control information the contact center is able to configure the freelance entity for use by the contact center.

Examples of how the sip freelance entity can be configured are now given.

The contact center in one embodiment configures the freelance agent with a temporary SIP URI and password for registration. The contact center also advantageously automatically registers the freelance agent in that case. The contact center is also able to configure download address book information such as the address of the supervisor that the freelance agent is working for or various addresses to allow the agent to invoke functionality on the contact center (e.g. Emergency Support request). The contact center can also be arranged to configure the media capabilities of the freelance agent such that they are optimised for use (e.g. Video and Voice Codec Settings). The contact center can also be arranged to use the web services to add contact center presence information states to a freelance agent's SIP client. For example this can enable the freelance agent to send information about its state, such as ready/not ready, logged in/logged out to the contact center.

In the case of a freelance media server the contact center can be arranged to download vXML or ccXML to the freelance media server or it may configure the freelance media server to go to a specific Web Server to receive vXML and ccXML when the media server receives a call from the contact center.

The SIP endpoint of the freelance entity has its own SIP address of record and this is registered at the registration server 46 as part of the configuration process. Typically a password is required in order to achieve this registration process and so the freelance entity needs to be provided with such a password in order to be able to register itself. Another option is to enable the contact center server 40 to register the freelance entity. This avoids the need to provide a password to the freelance entity and so improves security. However, there are occasions when the freelance entity will need to reregister, for example, if the agent's endpoint crashes.

For example, the freelance agent is configured to deliver presence states to the contact center server 40 such as "logged on", "ready" or "not ready". Alternatively the freelance agent provides this information to the contact center server using instant messaging or other media types.

The invention claimed is:

1. A method of enabling a contact center to use additional, external, resources comprising:
   a method executed by a contact center server, the method comprising the steps of:
   accessing, over a communications network, details of services of freelance contact center entities stored on an advertisement node, the details of services being published on the advertisement node by the freelance contact center entities and including (i) qualifications of the freelance contact center entities and (ii) requirements of the freelance contact center entities, wherein the advertisement node is accessible by the a freelance contact center entities over the communications network to publish the details of services;
   selecting one of the freelance contact center entities for use as an additional, external, resource of the contact center on the basis of the details of services accessed from the advertisement node;
   accessing, on the advertisement node, access information about how to access control information associated with the selected freelance contact center entity;
   accessing the control information associated with the selected freelance contact center entity based on the access information;
   using said control information to configure a remote server of the selected freelance contact center entity for use as an additional, external, resource of the contact center such that the selected freelance contact center entity meets pre-specified requirements.

2. A method as claimed in claim 1 wherein said pre-specified requirements are such that the contact center is then able to use the selected entity in a manner transparent to end users of the contact center.

3. A method as claimed in claim 1 wherein said pre-specified requirements are such that the contact center is able to control at least part of the operation of the remote server of the selected entity as part of the contact center.

4. A method as claimed in claim 1 wherein said control information is also used to configure the remote server of the selected entity such that it provides information about the status of the selected entity to the contact center.

5. A method as claimed in claim 1 wherein said entities comprise any of contact center agent stations and contact center treatment systems.

6. A method as claimed in claim 1 wherein said step (ii) of selecting one of the entities further comprises establishing an agreement between the contact center and the selected entity concerning provision of the external resources.

7. A method as claimed in claim 1 wherein said advertisement node comprises a directory of web services.

8. A method as claimed in claim 1 wherein said entities provide web services.

9. A server apparatus of a contact center arranged to use additional, external, resources, said server apparatus comprising:
   an input apparatus arranged to access, over a communications network, details of services of freelance contact center entities stored on an advertisement node, the details of services being published on the advertisement node by the freelance contact center entities and including (i) qualifications of the freelance contact center entities and (ii) requirements of the freelance contact center entities, wherein the advertisement node is accessible by the a freelance contact center entities over the communications network to publish the details of services; and
   a processor arranged to select one of the freelance contact center entities for use as an additional, external, resource of the contact center on the basis of the details of services accessed from the advertisement node;
   wherein the input apparatus is also arranged to access, on the advertisement node, access information about how to access control information associated with the selected freelance contact center entity and to access the control information associated with the selected freelance contact center entity based on the access information; and
   wherein said processor is also arranged to use said control information to configure a remote server of the selected freelance contact center entity for use as an additional, external, resource of the contact center such that the selected freelance contact center entity meets pre-specified requirements.

10. A non-transitory, computer readable medium carrying computer executable instructions which are arranged to control a contact center to carry out a method of enabling a contact center to use additional, external, resources, said method comprising the steps of:
    accessing, over a communications network, details of services of freelance contact center entities stored on an advertisement node, the details of services being published on the advertisement node by the freelance contact center entities and including (i) qualifications of the freelance contact center entities and (ii) requirements of the freelance contact center entities, wherein the advertisement node is accessible by the freelance contact center entities over the communications network to publish the details of services;
    selecting one of the freelance contact center entities for use as an additional, external, resource of the contact center on the basis of the details of services accessed from the advertisement node;
    accessing control information associated with the selected freelance contact center entity using access information obtained from the advertisement node;
    using said control information to configure a web service provided by the selected freelance contact center entity for use as an additional, external, resource of the contact center such that the selected freelance contact center entity meets pre-specified requirements.

* * * * *